United States Patent

Rose-Miller

[15] 3,703,159
[45] Nov. 21, 1972

[54] CONTAINER FOR TRANSPORT OF ANIMALS

[72] Inventor: Brigadier George Patrick Rose-Miller, "Barevan" Cawdor, Nairn, Scotland

[22] Filed: Aug. 18, 1970

[21] Appl. No.: 64,705

[30] Foreign Application Priority Data

Oct. 3, 1969 Great Britain..........48,626/69

[52] U.S. Cl......................................119/19, 119/71
[51] Int. Cl..........................A01k 1/02, A01k 9/00
[58] Field of Search.......119/17, 18, 19, 15, 71, 72.5; 229/6, 7, 42, 37

[56] References Cited

UNITED STATES PATENTS

| | | | |
|---|---|---|---|
| 670,823 | 3/1901 | Swope | 119/71 |
| 3,524,432 | 8/1970 | Tartar | 119/71 X |
| 2,422,438 | 6/1947 | Richards | 119/19 |
| 3,320,929 | 5/1967 | Kay | 119/18 |
| 3,537,428 | 11/1970 | Montgomery | 119/15 X |
| 2,881,733 | 4/1959 | Young, Jr. et al. | 119/15 |
| 2,825,301 | 3/1958 | Quist | 119/15 |
| 3,192,902 | 7/1965 | Gammill | 119/71 X |
| 3,285,226 | 11/1966 | Schuler | 119/71 |
| 2,722,217 | 11/1955 | Rose-Miller | 119/71 X |
| 2,979,027 | 4/1961 | Corwin et al. | 119/15 |
| 3,589,338 | 6/1971 | Lovitz | 119/72.5 |

*Primary Examiner*—Aldrich F. Medbery
*Attorney*—Larson, Taylor and Hinds

[57] ABSTRACT

A box for transporting unweaned animals of the type which nurse in a standing position. The box, normally closed at its bottom and opened at its top includes a platform to support a liquid feed vessel vertically such that the vessel is prevented from either upward or downward movement. The vessel includes a lower opening and a feed device attached to said lower opening so that the nipple of the device is at a height similar to the height of the nipple on a mother animal and so that the nipple is at one end of the box and off to one side thereof so that the animal can stand length-wise in the box and turn its head while feeding.

21 Claims, 15 Drawing Figures

CONTAINER FOR TRANSPORT OF ANIMALS

The invention relates to containers for the transport of animals. More particularly, the invention relates to disposable containers of cardboard or other inexpensive material suitable for the transport of calves by air.

It has been proposed to provide a transport container having means for carrying a container of liquid feed for the animal being transported. Difficulties are encountered in suitably retaining the feed container, while nevertheless having a transport container which is inexpensive and which can be readily constructed from flat sheet material, for example corrugated cardboard.

In order to make the invention clearly understood, reference will now be made to the accompanying drawings which are given by way of example and in which.

Figure 2:
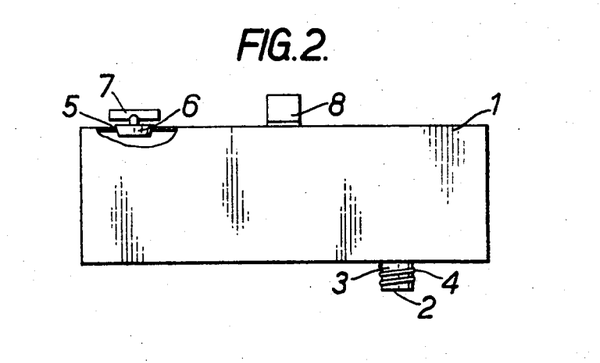
FIG. 2 is an elevation view of a liquid feed vessel for use in the transport container.
Figure 3:
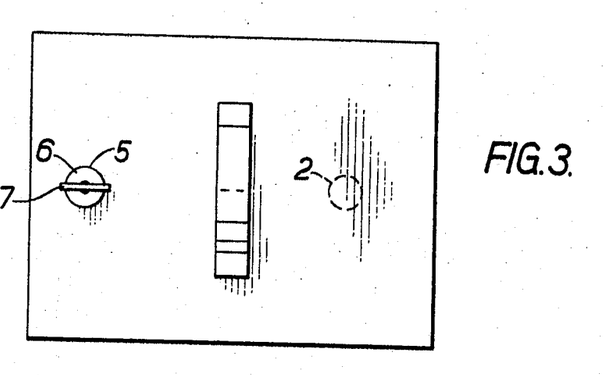
FIG. 3 is a plan view of the liquid feed vessel of FIG. 2.

The transport container is adapted to securely retain the feed vessel of FIGS. 2, 3 and 4 in position, and to facilitate description of the container and to facilitate understanding of the reasons for providing various elements of the container, the feed vessel of FIGS. 2, 3 and 4 will first be described. The feed vessel is preferably made of polyethylene and comprises a body 1 having generally the shape of a rectangular prism. The vessel body can conveniently be made by blow moulding and it can readily be ensured that all internal corners are rounded so as to facilitate cleaning of the vessel. In the lower wall of the vessel an opening 2 is formed which is bounded by a tubular formation 3 having exterior screw threads 4. In the upper wall of the body 1, an opening 5 is provided for receiving a plug 6, which may be of rubber, the plug carrying a tubular T-piece 7 which allows air to enter into the vessel but which does not readily allow liquid to be splashed out from the vessel, for example during transport. Alternatively, the opening 5 may be replaced with an enlarged opening, of sufficient size for a person to place his hand therethrough, for cleaning purposes or the like; and this opening will normally be covered by a suitable lid. On the upper wall of the body 1, a handle 8 is provided, and the lower wall 9 of the vessel is of sloping configuration, so as to facilitate complete drainage of the vessel contents to the outlet opening 2. The sloping configuration of the bottom wall 9 of the vessel does not extend to the extreme ends of the vessel, so that webs 10 remain, which result in the ends of the vessel being precisely rectangular whereby to ensure that the vessel can be firmly supported on a flat surface.

Figures 4, 5, 5A:
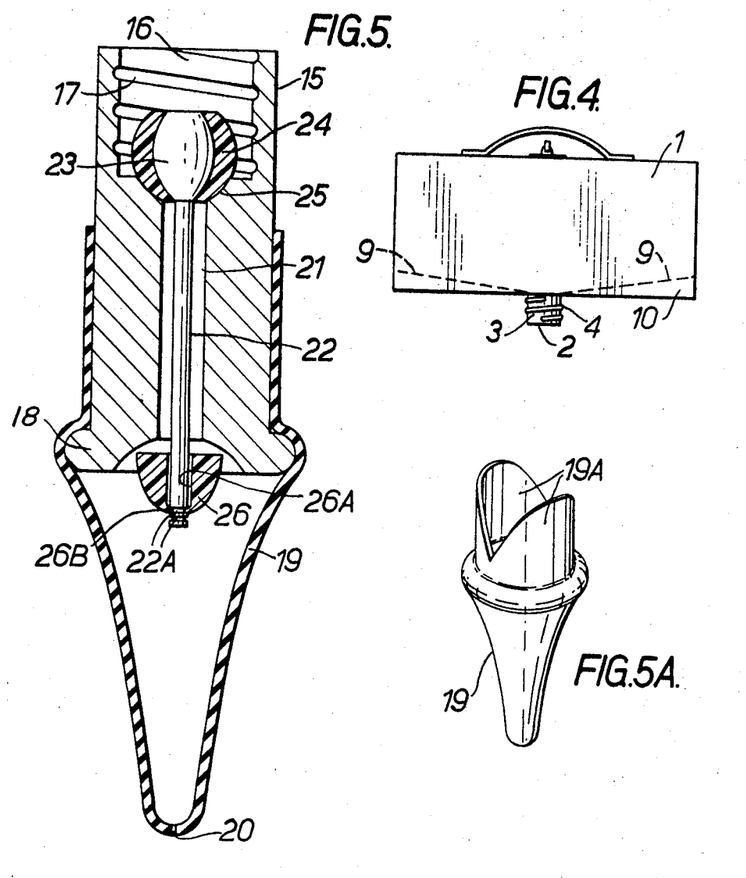
FIG. 4 is an end view of the liquid feed vessel of FIG. 2.
FIG. 5 is a sectional view, to a larger scale than FIGS. 2, 3 and 4, of a nozzle and teat assembly suitable for screwing onto an outlet connection member of the feed vessel of FIGS. 2, 3 and 4.
FIG. 5A is a perspective view, to a smaller scale than FIG. 5, of a nipple member of the assembly of FIG. 5.

When the vessel is fitted to the transport container, in a manner which will subsequently be described, the nozzle and teat assembly of FIG. 5 is screwed onto the outlet formation 3. The teat is also referred to at times hereinafter as a nipple.

The nozzle and teat assembly comprises a body 15 which is generally tubular shaped and which is preferably made of plastics material. The body 15 has a recess 16 provided with screw threads 17 adapted to mate with the screw threads 5 of the vessel formation 3. The body 15, at its end remote from the recess 16, has a flange 18 which serves for retaining the teat member 19, which is of rubber and which is tightly tensioned over the flange 18 and over the lower region of the body 15. As shown in FIG. 5A, the teat member 19 has a pair of tabs 19A at its upper end, to facilitate pulling it over the flange 18 of the body 15. The teat member 19 has at its lower end an opening 20 through which liquid feed, for example milk composition, can be drawn by the animal. Between the recess 16 and the interior of the teat member 19, a bore 21 extends through the body 15, this bore allowing passage of milk from the vessel to the teat.

A valve member is disposed within the body 15, and comprises a valve stem 22 which at its upper end has an enlarged metal portion 23 on which is mounted a rubber head 24, of generally spherical shape. The head 24 cooperates with a partially spherical seat 25 formed in the body 15. At its lower end, the rod 22 carries a rubber member 26, the rod 22 passing through a passageway 26A in the rubber member 26. Adjusting means are provided for attaching the rubber member 26 at any selected one of a plurality of different vertical positions on the rod 22. These adjusting means comprise a plurality of circumferential grooves 22A formed on the rod 22 and a circumferential ring 26B extending inwardly, in said passageway 26A, said ring 26B being matable with any one of the grooves 22A.

When the nozzle and teat assembly is screwed onto the formation 3 of the vessel, so that the nozzle and teat assembly is directed downwardly, the valve head 24 sealingly engages the seat 25 so as to normally prevent passage of milk from the body 1 into the bore 21. Thus, the valve head 24 by engaging the seat 25 ensures that there is no leakage of milk, when milk is charged into the vessel body 1 through the upper opening 5 thereof.

When a calf sucks on the teat 19 in its normal sucking action, the rod 22 is cylindrically displaced in its axial direction so that the valve head 24 is lifted from the seat 25 in a rhythm depending on the sucking action of the calf, so that milk can pass from the body 1 to the teat 19, for consumption by the calf. Collapse of the body 1 and possible difficulties in retaining it in position, are avoided by the provision of the air entry opening 5 in the upper wall of the body 1.

Figure 1:
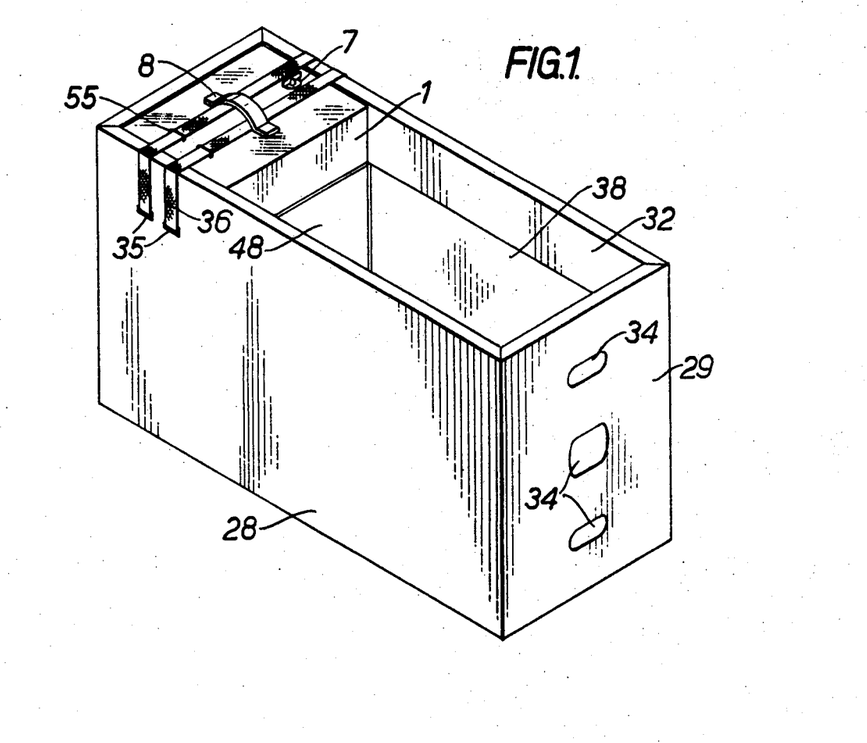
FIG. 1 is a perspective view of a transport container of the invention.
Figure 6:
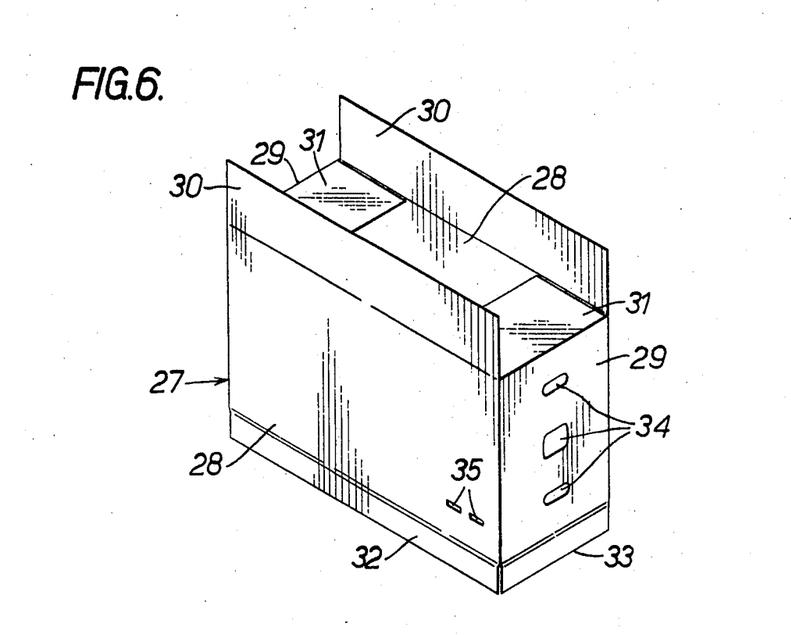
FIG. 6 is a perspective view showing an outer portion of the transport container of the invention, during one phase of its assembly.

The transport container itself comprises an outer box portion 27, which as will be seen from FIG. 6 has side walls 28, end walls 29, two pairs of bottom flaps 30 and 31 and two pairs of top flaps 32 and 33. Holes 34 for allowing fingers to be inserted for carrying the container, and for allowing the entry of air into the container are provided in the end walls 29. Holes 35 for receiving straps 36 which secure the feed vessel 1 are provided in the side walls 28 of the container. The container is shown in its fully assembled condition in FIG. 1, already fitted with the feed vessel 1. As shown in FIG. 1, as well as the outer box portion 27 of the container, various inner members are provided which result in the container having a double wall apart from at its ends 29.

Figure 7:
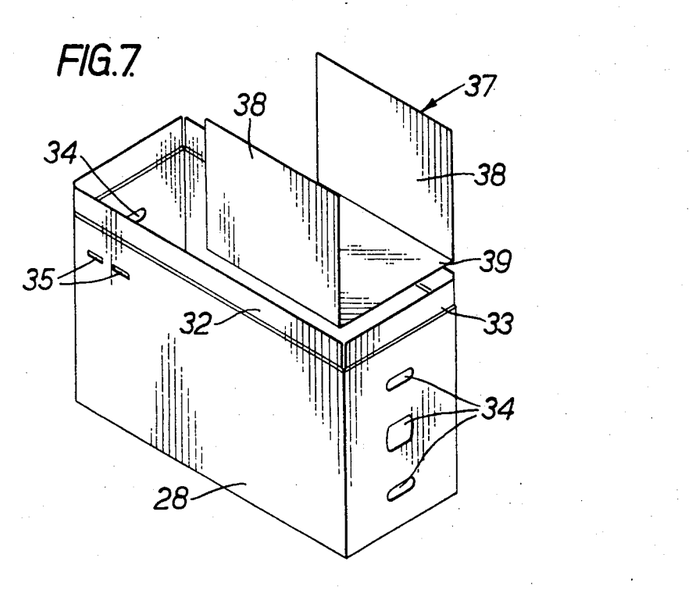
FIGS. 7, 8, 9, 11, 12 and 14 are perspective views showing further phases in the assembly of the transport container of the invention.

FIG. 7 illustrates a first stage in the provision of the structure intended to form the inner wall. Here, a U-shaped part 37 of cardboard is provided, which has been bent from a flat sheet of cardboard. The U-shaped part 37 is inserted into the container from the open top thereof, so that the bottom portion 39 of the part 37 engages against the bottom of the container and the side flaps 38 of the part 37 engage against the insides of the container side walls 28. It can be seen from FIG. 11, that the side flaps 38 of the part 37 extend almost to the top of the box part 28 of the container, ignoring the top flaps 32 and 33.

Figure 8:
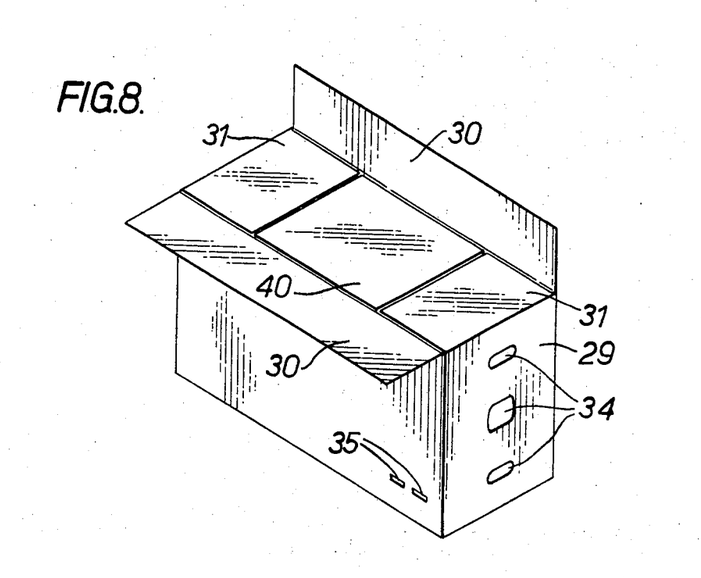
Figure 9:
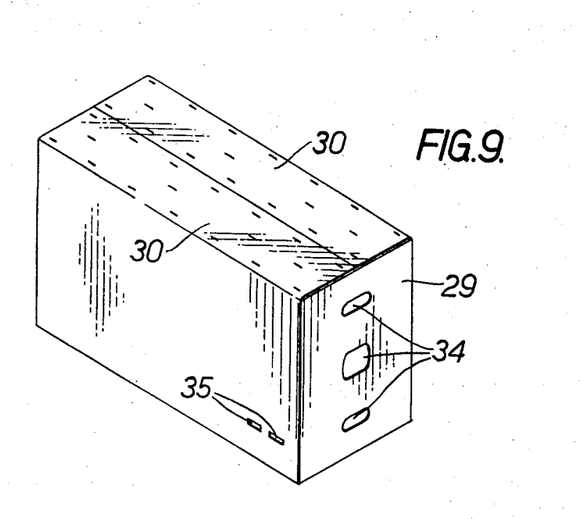

After insertion of the U-shaped part 37, the container is inverted and a panel 40 of cardboard is inserted in the gap between the ends of the shorter bottom flaps 31 of the container as shown in FIG. 8. The flaps 30 of the container bottom are then folded over as shown in FIG. 9, and all of the superimposed layers at the bottom of the container are stapled together. Thus, the U-shaped part 37 is firmly secured by means of its bottom part 39.

Figure 10:
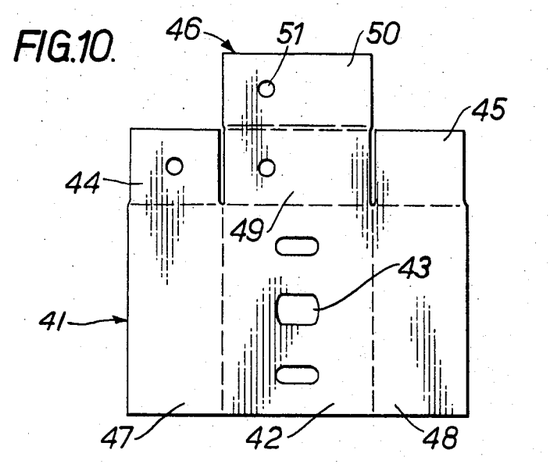
FIG. 10 is a view illustrating a support member for the feed vessel, before folding into a shape suitable for assembly in to the transport container.

The container is then turned the correct way up again and a support 41 for the feed vessel 1 is inserted into the container. The support 41 is in the form of a box member without a bottom or front, and is formed by folding from a cut-out the shape of which is shown in FIG. 10. The rear wall 42 of the support 41 can be seen in FIG. 11, this view showing the support 41 only partly inserted into the container. It will be seen that openings 43 are provided in the rear 42 of the support 41, these openings being so positioned that they are in alignment with the openings 34 in one of the end walls 29 of the container, when the support 41 has been fully inserted into the container. It will be seen from FIG. 10, that the blank from which the support 41 is formed has three end flaps 44, 45 and 46. The end flaps 44 and 45 are extensions of side flaps 47 and 48 of the blank, these side flaps 47 and 48 engaging against the inner wall of the box shaped member 28 of the container and their dimensions being such that when the support 41 is fully inserted into the container, the free side edges of the end walls 47 and 48 substantially abut against free side edges of the flaps 38 of the U-shaped part 37. Thus, the U-shaped part 37 assists in preventing the support 41 from being drawn away from the end wall 29 of the container. The flap 46 of the blank shown in FIG. 10 is an extension of the part 42 of the blank and it will be seen from a configuration of FIGS. 11 and 12 that for forming the support 41 from the blank, the blank is folded in such a sequence that a portion 49 of the flap 46 is first folded over away from the portion 42, then the end portions 47 and 48 are folded so as to be at right angles to the portion 42, then the flaps 44 and 45 are folded over above the portion 49, this resulting in the condition of the flaps shown in FIG. 11. The remaining part 50 of the flap 46 then remains for being folded over on top of the flaps 44 and 45, after insertion of straps 36 as shown in FIG. 12. The flap 44 and the portions 49 and 50 of the flap 46 have openings 51 which come into alignment in the finally folded condition of the support 41, thus producing an opening extending through three thicknesses of material, this opening serving for receiving the nozzle and teat assembly of the feed vessel, so that the nozzle and teat assembly projects downwardly below the shelf which has been produced by folding the flaps 44, 45 and 46, so as to be accessible to a calf in the container.

After the straps 36 have been inserted as shown in FIG. 12, the flap portion 50 is folded back on top of the straps 36 and the flaps 32 and 33 of the top of the container are folded inwardly into the position shown in FIG. 1. It will be seen that the flaps 32 thus lie inwardly of the flaps 38 of the U-shaped part 37 but lie with their edges substantially in alignment with the ends of the top of the support 41. This disposition of the flaps 32 and 33 can be seen from FIG. 1, and it will be appreciated that by turning the flaps 32 and 33 inwardly in this manner, the raw edges of these flaps are not exposed to rain.

Figure 11:
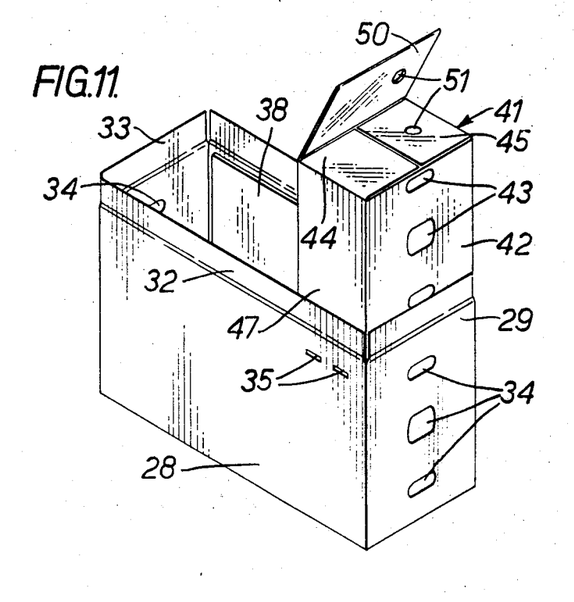
Figure 12:
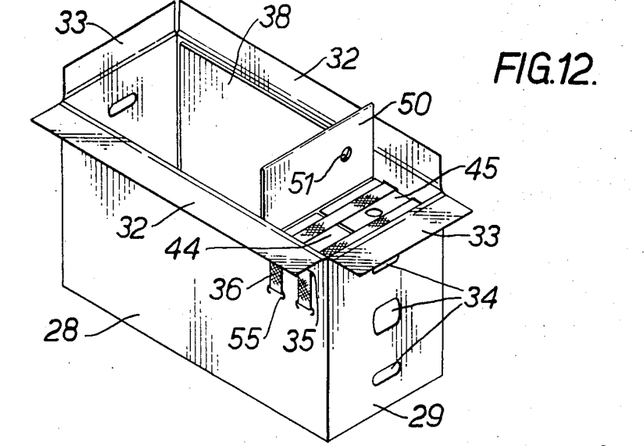
Figure 13:
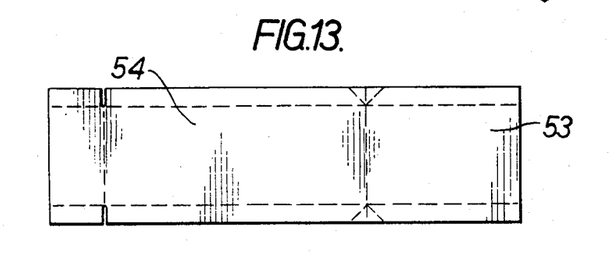
FIG. 13 is a view showing the shape of a urine tray member before folding into a shape suitable for assembly into the container, this assembly being shown in FIG. 14.
Figure 14:
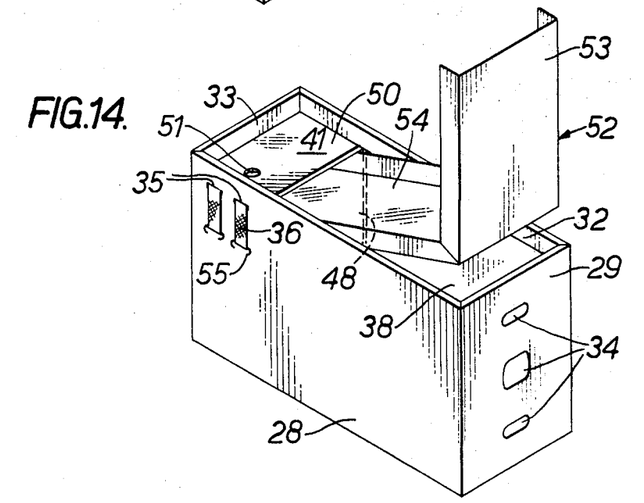

After the support 41 has been inserted as shown in FIGS. 11 and 12, and the flap portion 50 turned back so as to lie on top of the portions of the straps 36 visible above the flaps 44 and 45 in FIG. 12, a urine tray is inserted in the manner shown in FIG. 14. The urine tray 52 is formed from a blank shown in FIG. 13 and has a waxed bottom 53 and a splash back 54. The splash back 54 is first engaged underneath the vessel support 41 and the entire structure is then swung into the container as shown in FIG. 14.

After assembly of the container as described above, the feed vessel 1 is positioned on the support 41 so as to lie on top of the flap 50 thereof, with its teat and nozzle assembly extending downwardly through the aligned holes 51. The straps 36 which as described above had already been threaded through the holes 35 of the outer wall 27 of the container are then passed above the feed vessel 1, threaded through the handle 8 thereof and fastened by means of buckles 55. Of course, instead of straps 36, elastic bands may be used, the ends of which are secured in the holes 35 by knotting In such a case, the handle of the feed vessel 1 may be of T-shaped construction so that the elastic bands can be inserted under the crossed piece of the T. Alternatively, any other suitable means for fixing the feed vessel 1 onto the support 41 may be provided, so long as the feed vessel 1 is retained against being pushed upwardly from the support 41 by the calf.

Although the invention has been described in considerable detail with respect to preferred embodiments thereof, it will be apparent that the invention is capable of numerous modifications and variations apparent to those skilled in the art without departing from the spirit and scope of the invention.

I claim:

1. A box for transporting unweaned animals of the type which nurse in a standing position, said box being elongated and having a bottom, side walls and end walls, the box being slightly longer than the animal being transported, the walls and bottom of the box being of a stiff material wherein the sides and ends are a single piece of material capable of being opened up into a flat blank, a support member within the box at a first end thereof for supporting a feed vessel of the type having a suckling opening extending downwardly therefrom, said support member including a horizontally extending ledge for supporting the feed vessel, and means for making the suckling opening of the feed vessel accessible below the ledge, the ledge being at a vertical level sufficiently high above the bottom of the box for the animal to nurse from said suckling opening below the ledge, said support member further including side portions attached to the ledge and extending to the bottom of the box to support the said ledge at said level above the floor, the side portions being arranged to leave an opening for the animal to extend beneath the ledge to feed from said suckling opening.

2. A box according to claim 1, the walls and bottom of the box being generally rectangular, and said means for making the suckling opening accessible comprising an aperture in the ledge for receiving the suckling opening therethrough.

3. A box according to claim 1, including a feed vessel on said ledge and said means for making the suckling opening accessible comprising an aperture in the ledge and said suckling opening extending through said aperture in said ledge.

4. A box according to claim 2 said feed vessel being rectangular in shape and the bottom thereof conforming generally to the shape of the ledge and said vessel being of a height not exceeding the distance from the ledge to the top of the box, said suckling opening being in the bottom thereof.

5. A box according to claim 4, said aperture being located on one side of said ledge closest to one side of said box, said suckling opening located near one end of the vessel and aligned with said aperture in the ledge when the vessel is positioned on the ledge.

6. A box according to claim 4, wherein said support member side portions are positioned adjacent the sides of the box near the first end of the box, said ledge extending across the box connecting the two side portions, and wherein said ledge includes two layers, and a flap extending from said side portions between the layers of the ledge, said suckling opening including a collar passing through both layers and one of said flaps.

7. A box according to claim 3, including a reinforcing means for preventing accidental upward movement of the vessel.

8. A box according to claim 7, said reinforcing means including a strap passing parallel to the ledge beneath the vessel and extending out through the sides of the box.

9. A box according to claim 8, said strap further extending from the outside of the box up and over the vessel in place.

10. A box according to claim 1 wherein the animal is a calf and the length and width of the box and the said location of the feed opening are with respect to the size of an unweaned infant calf.

11. A box according to claim 1, said box including upper and lower side flaps and upper and lower end flaps which extend from the top and bottom of the sides and the top and bottom of the ends, respectively, said flaps also being flat when the single piece is opened up into a flat blank.

12. A box according to claim 1, wherein said side portions are positioned adjacent the inner sides of the box near the first end of the box, said ledge extending completely across the box connecting the two side portions.

13. A box according to claim 12, said support member also including an end portion positioned flush against the first end of the box and integral with the side portions and the ledge of the support member, such that the ledge is further supported vertically by said end portion.

14. A box according to claim 13, wherein said support member is of a stiff material and wherein said ledge, said side portions and said end portion are all integral with each other and said support member is capable of being opened up into a flat blank.

15. A box according to claim 12, wherein said ledge is constructed in two layers integral with each other and hinged about an axis parallel to the end of the box and including an elongated reinforcing structure extending across the box between the layers and passing through the sides of the box to substantially prevent vertical displacement of the ledge.

16. A box according to claim 12, including a U-shaped part having flat side parts positioned against the sides of the box and a bottom part connecting the side parts and positioned on the bottom of the box, said U-shaped part extending from the support member to the second end of the box.

17. A box according to claim 12, wherein said box is open topped and includes side flaps along the top of the sides of the box, said side flaps being folded into the box and secured thereto and positioned immediately above the ledge to assist in preventing upward vertical movement of the ledge.

18. A box according to claim 17, including a U-shaped part having flat side parts positioned against the sides of the box and a bottom part connecting the side parts and positioned on the bottom of the box, said U-shaped part extending from the support member to the second end of the box, and wherein the said flaps extending from the side of the box lie over the tops of the sides of the U-shaped part to secure them to the sides of the box.

19. A box according to claim 17, wherein said box includes end flaps along the top of the first and second ends, said end of the flaps being folded into the box and secured such that the end flap at the first end of the box is positioned immediately above the ledge to assist in preventing upward vertical movement of the ledge.

20. A box according to claim 12, including a catch tray including a tray bottom extending over the entire floor space of the box and including side walls extending upwardly around the periphery of the said tray bottom.

21. A box according to claim 1, the bottom of the box including a pair of bottom side flaps which are integral with and folded in from the sides of the box to cover the entire bottom of the box and form the outer layer thereof and a pair of bottom end flaps integral with the ends of the box and extending inwardly a distance less than half of the length of the box, and a panel in the bottom of the box between the inner ends of the end flaps and lying in the same plane as the end flaps and forming with the end flaps an inner layer inside of said outer layer, said inner and outer layers being secured together to form the bottom of the box.

* * * * *